United States Patent
Lien et al.

(10) Patent No.: US 6,446,242 B1
(45) Date of Patent: Sep. 3, 2002

(54) METHOD AND APPARATUS FOR STORING A VALIDATION NUMBER IN A FIELD-PROGRAMMABLE GATE ARRAY

(75) Inventors: Jung-Cheun Lien, San Jose; Sheng Feng, Cupertino; Chung-yuan Sun, San Jose; Eddy Chieh Huang, San Jose, all of CA (US)

(73) Assignee: Actel Corporation, Sunnyvale, CA (US)

( * ) Notice: Subject to any disclaimer, the term of this patent is extended or adjusted under 35 U.S.C. 154(b) by 0 days.

(21) Appl. No.: 09/285,563

(22) Filed: Apr. 2, 1999

(51) Int. Cl.[7] .............................................. G06F 17/50
(52) U.S. Cl. ................. 716/6; 716/16; 716/17
(58) Field of Search ............................. 716/6, 16, 17; 326/38, 40

(56) References Cited

U.S. PATENT DOCUMENTS

| | | | |
|---|---|---|---|
| 4,908,528 A | | 3/1990 | Huang ......................... 307/443 |
| 5,475,830 A | * | 12/1995 | Chen et al. .................... 716/16 |
| 5,694,056 A | * | 12/1997 | Mahoney et al. .............. 326/38 |
| 5,773,993 A | * | 6/1998 | Trimberger .................. 326/38 |
| 5,805,496 A | | 9/1998 | Batson et al. ................. 365/154 |
| 5,809,281 A | | 9/1998 | Steele et al. ........... 395/497.01 |
| 5,818,750 A | | 10/1998 | Manning .................... 365/154 |
| 5,949,690 A | * | 9/1999 | Lawman ........................ 716/6 |
| 6,069,489 A | * | 5/2000 | Iwanczuk et al. ............. 326/40 |
| 6,091,263 A | * | 7/2000 | New et al. .................... 326/40 |

\* cited by examiner

Primary Examiner—Huan Hoang

(57) ABSTRACT

An apparatus including a field-programmable gate array (FPGA) where the FPGA includes a plurality of X signal lines, a plurality of Y signal lines, and a plurality of memory cells. A first set of the memory cells are used to implement programmable interconnections between the X and Y signal lines and logic functions such as are implemented by configurable functional blocks, and a second set of the memory cells are not used to implement programmable interconnections between the X and Y signal lines or logic functions. Configuration data that is used to implement a specific configuration of the programmable interconnections between the X and Y signal lines and the logic function is stored in the first set of memory cells, and at least a portion of a validation number is stored in at least some of the second set of memory cells. A method of configuring an FPGA includes storing configuration data used for configuring programmable interconnections among a plurality of X and Y signal lines and other logic functions in memory cells in the FPGA used for implementing the programmable interconnections and logic functions, and storing bits of data that form at least a portion of a validation number in memory cells in the FPGA that are not used for implementing the programmable interconnections or logic functions.

16 Claims, 7 Drawing Sheets

METHOD AND APPARATUS FOR STORING A VALIDATION NUMBER IN A FIELD-PROGRAMMABLE GATE ARRAY

BACKGROUND OF THE INVENTION

1. Field of the Invention

The present invention relates to field-programmable gate arrays, and more particularly, to a method and apparatus for tracking and validating the use of FPGA designs that have been embedded in various integrated circuits.

2. Description of the Related Art

A field-programmable gate array (FPGA) is an integrated circuit (IC) that includes a two-dimensional array of general-purpose logic circuits, called cells or logic blocks, whose functions are programmable. The cells are linked to one another by programmable buses. The cell types may be small multifinction circuits (or configurable functional blocks) capable of realizing all Boolean functions of a few variables. The cell types are not restricted to gates. For example, configurable functional blocks typically include memory cells and connection transistors that may be used to configure logic functions such as addition, subtraction, etc., inside of the FPGA. A cell may also contain one or two flip-flops. Two types of logic cells found in FPGAs are those based on multiplexers and those based on programmable read only memory (PROM) table-lookup memories. Erasable FPGAs can be reprogrammed many times. This technology is especially convenient when developing and debugging a prototype design for a new product and for small-scale manufacture.

FPGAs typically included a physical template that includes an array of circuits, sets of uncommitted routing interconnects, and sets of user programmable switches associated with both the circuits and the routing interconnects. When these switches are properly programmed (set to on or off states), the template or the underlying circuit and interconnect of the FPGA is customized or configured to perform specific customized functions. By reprogramming the on-off states of these switches, an FPGA can perform many different functions. Once a specific configuration of an FPGA has been decided upon, it can be configured to perform that one specific function.

The user programmable switches in an FPGA can be implemented in various technologies, such as ONO antifuse, M—M antifuse, SRAM memory cell, Flash EEPROM memory cell, and EEPROM memory cell. FPGAs that employ fuses or antifuses as switches can be programmed only once. A memory cell controlled switch implementation of an FPGA can be reprogrammed repeatedly. In this scenario, an NMOS transistor is typically used as the switch to either connect or disconnect two selected points (A, B) in the circuit. The NMOS' source and drain nodes are connected to points A, B respectively, and its gate node is directly or indirectly connected to the memory cell. By setting the state of the memory cell to either logical "1" or "0", the switch can be turned on or off and thus point A and B are either connected or disconnected. Thus, the ability to program these switches provides for a very flexible device.

FPGAs can store the program that determines the circuit to be implemented in a RAM or PROM on the FPGA chip. The pattern of the data in this configuration memory CM determines the cells' function and their interconnection wiring. Each bit of CM controls a transistor switch in the target circuit that can select some cell function or make (or break) some connection. By replacing the contents of CM, designers can make design changes or correct design errors.

The CM can be downloaded from an external source or stored on-chip. This type of FPGA can be reprogrammed repeatedly, which significantly reduces development and manufacturing costs.

In general, an FPGA is one type of programmable logic device (PLD), i.e., a device that contains many gates or other general-purpose cells whose interconnections can be configured or "programmed" to implement any desired combinational or sequential function. As its name implies, an FPGA is "field-programmable", meaning that the device is generally programmed by designers or end users "in the field" via small, low-cost programming units. This is in contrast to mask programmable devices which require special steps in the IC chip-manufacturing process. A field-programming unit typically uses design software to program the FPGA. The design software translates a specific configuration of the programmable switches desired by the end-user into a bit stream which is fed into the FPGA. The bit stream creates the pattern of the data in the configuration memory CM that determines whether,each memory cell stores a "1" or a "0". The stored bit in each CM controls whether its associated transistor switch is turned on or off.

Designers of FPGAs (as well as other PLDs) often provide their circuit designs to IC manufacturers who embed the FPGA designs into larger ICs. An example of such a larger IC is a system on a chip (SOC) that includes the embedded FPGA as well as several other components. The several other components may include, for example, a microprocessor, memory, arithmetic logic unit (ALU), state machine, etc. In this scenario the embedded FPGA is only a small part of the whole SOC.

The FPGA designer typically licenses the manufacturer of the larger IC to use the FPGA design in certain products, e.g., certain SOC chips. Use of the FPGA design in any other products is a violation of the license agreement. It is difficult, however, for the FPGA designer to track the use of its design in unlicensed products due to the microscopic design being concealed in the IC. Thus, there is a need for a way for designers of FPGAs (and other PLDs) to track and validate the use of their designs that have been embedded in various ICs.

BRIEF SUMMARY OF THE INVENTION

The present invention provides a method of configuring a field-programmable gate array (FPGA). The method includes storing configuration data used for configuring programmable interconnections among a plurality of X and Y signal lines in memory cells in the FPGA used for implementing the programmable interconnections; and storing bits of data that form at least a portion of a validation number in memory cells in the FPGA that are not used for implementing the programmable interconnections.

The present invention also provides an apparatus including an FPGA. The FPGA includes a plurality of X signal lines, a plurality of Y signal lines, and a plurality of memory cells. A first set of the memory cells are used to implement programmable interconnections between the X and Y signal lines, and a second set of the memory cells are not used to implement programmable interconnections between the X and Y signal lines. Configuration data that is used to implement a specific configuration of the programmable interconnections between the X and Y signal lines is stored in the first set of memory cells, and at least a portion of a validation number is stored in at least some of the second set of memory cells.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
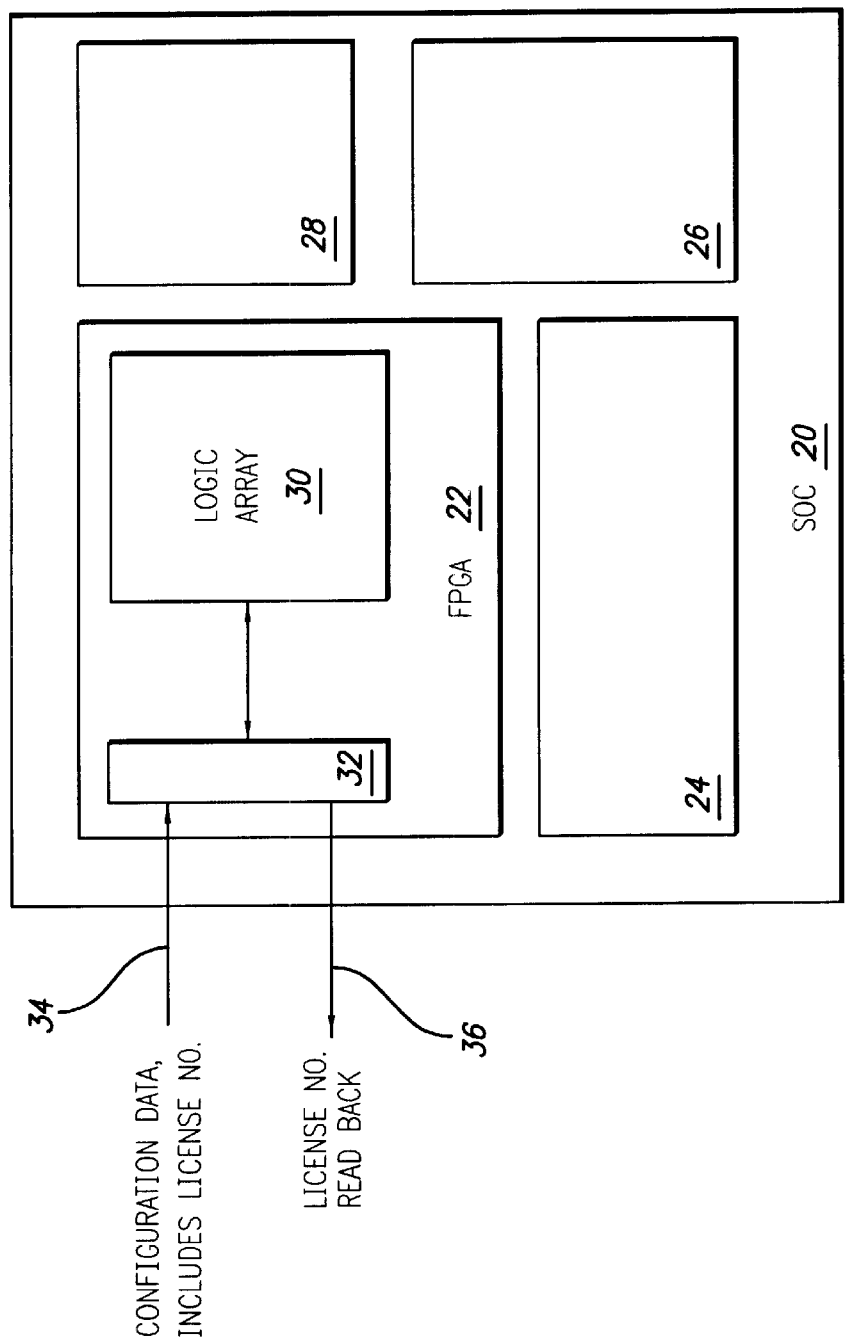
FIG. 1 is block diagram illustrating a system on a chip (SOC) that includes an FPGA in accordance with the present invention.

Referring to FIG. 1, there is illustrated a system on a chip (SOC) 20 having a field-programmable gate array (FPGA) 22 embedded therein that utilizes a system for tracking and validating its use in various ICs in accordance with the present invention. The system for tracking and validating use described herein may be used as a mechanism for monitoring and verifying that license agreements are being honored. As shown in FIG. 1, the FPGA 22 is embedded in a larger IC chip, i.e., the SOC 20. It should be understood, however, that the FPGA 22 may be implemented in its own IC chip with no other components in accordance with the present invention.

In addition to the FPGA 22, the SOC 20 may include several other components 24, 26, 28. Any number of other components may be included, and the other components may include, for example, a microprocessor, memory, arithmetic logic unit (ALU), state machine, etc. The FPGA 22 may be spread across one or more FPGA regions within the SOC 20. The FPGA 22 generally includes a logic array 30 and a programming interface 32. The logic array 30 is the uncommitted resources that can be configured and customized to perform specific functions and includes the user programmable switches described above. The programming interface 32 is used to receive and read configuration data to and from the FPGA 22.

As discussed above, FPGAs use configuration data to configure or customize the underlying array or generic modules to perform specific functions. The configuration data is typically transferred to the configuration memories (CM) by a field-programming unit and is stored either external or internal to the FPGA 22. The configuration data is used to set the user programmable switches that are included in the logic array 24. By properly programming these switches (setting them to on or off states), the underlying circuit and interconnects of the FPGA 22 is customized or configured to perform specific customized functions.

In accordance with the present invention, a license number or other identifying number or tracking number is included as part of the configuration data that is fed into the FPGA 22. This data is fed into port 34. The license number may be any type of number that the FPGA designer wishes to use to track and validate the use of the FPGA design. As used herein, the term "validation number" is meant to include all such license numbers, tracking numbers, identifying numbers, etc. An example of a typical scenario is as follows. The FPGA designer may provide to the IC manufacturer one license number for each product in which the FPGA 22 design is to be embedded. In other words, the IC manufacturer (or other user) is licensed to use the FPGA 22 design in one part or product and gets a license number for use of the FPGA 22 in that part or product. If the IC manufacturer wishes to use the FPGA 22 design in a second part or product, a second license from the FPGA designer is needed for that use, and as part of that second license, the FPGA designer will typically provide a second license number to the IC manufacturer. Thus, the IC manufacturer needs a separate license from the FPGA designer for each product into which the FPGA design is to be embedded, and as part of each such license, the FPGA designer will provide a license number to the IC manufacturer. In this way, there will be a different license number for each product in which the FPGA 22 design is to be used.

In accordance with the present invention, the license number (or other identifying number or tracking number) that is included as part of the configuration data may be read out of the FPGA 22 in order to verify that the correct license number has been entered. This data is read from port 36 and can be read from the FPGA 22 without disturbing its operation. It should be understood that ports 34 and 36 may be combined into a single port, or combined with some other port. By reading back the license number, the use of the embedded FPGA 22 can be tracked and validated. For example, if the license number read from one product is actually the license number for a different product, this may indicate that the manufacturer of the product failed to obtain a new license from the FPGA designer for use of the design in a different product. Thus, by analyzing the read-back license number, one can determine whether the FPGA is operated with the intended license number.

Figure 2:
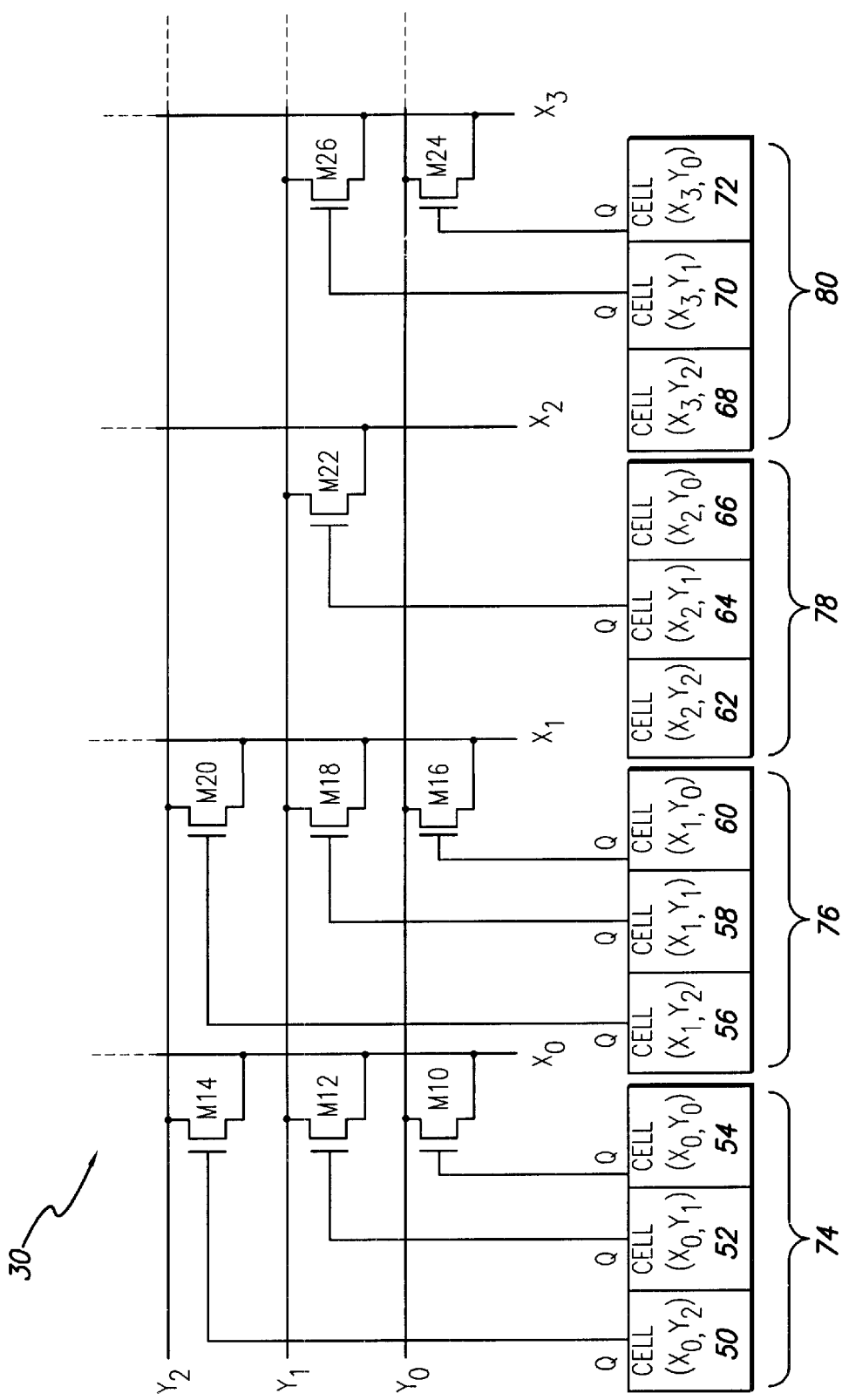
FIG. 2 is a schematic diagram illustrating the logic array shown in FIG. 1 in greater detail.

Referring to FIG. 2, the logic array 30 is illustrated in more detail. In general, the logic array 30 includes several X signal lines $X_0, X_1, X_2, X_3, \ldots$, and several Y signal lines $Y_0, Y_1, Y_2, Y_3, \ldots$. Several memory cells 50, 52, 54, 56, 58, 60, 62, 64, 66, 68, 70, 72 are also included. Each of the memory cells 50–72 corresponds to an intersection of one of the X signal lines with one of the Y signal lines. This is indicated in FIG. 2 which shows that each memory cell has corresponding X and Y coordinates. For example, memory cell 58 has coordinates $(X_1, Y_1)$ meaning that its associated intersection is the intersection where the $X_1$ signal line crosses the $Y_1$ signal line. Each one of several connection transistors M10, M12, M14, M16, M18, M20, M22, M24, M26 are coupled to the X signal line and the Y signal line of each of several intersections. The gate of each connection transistor M10–M26 is coupled to a different one of the memory cells 50–72.

The memory cells used in FPGAs are typically collected together into banks of memory cells. For example, the memory cells 50–72 may be distributed across memory cell banks 74, 76, 78, 80. Because the memory cells are manufactured as banks of cells, there are often leftover cells that are not used, i.e., memory cells that are not coupled to connection transistors. For example, the memory cells 62, 66 and 68 are not coupled to any connection transistors, and thus, these cells are not being used to implement programmable connections in the logic array 30.

Figure 3:
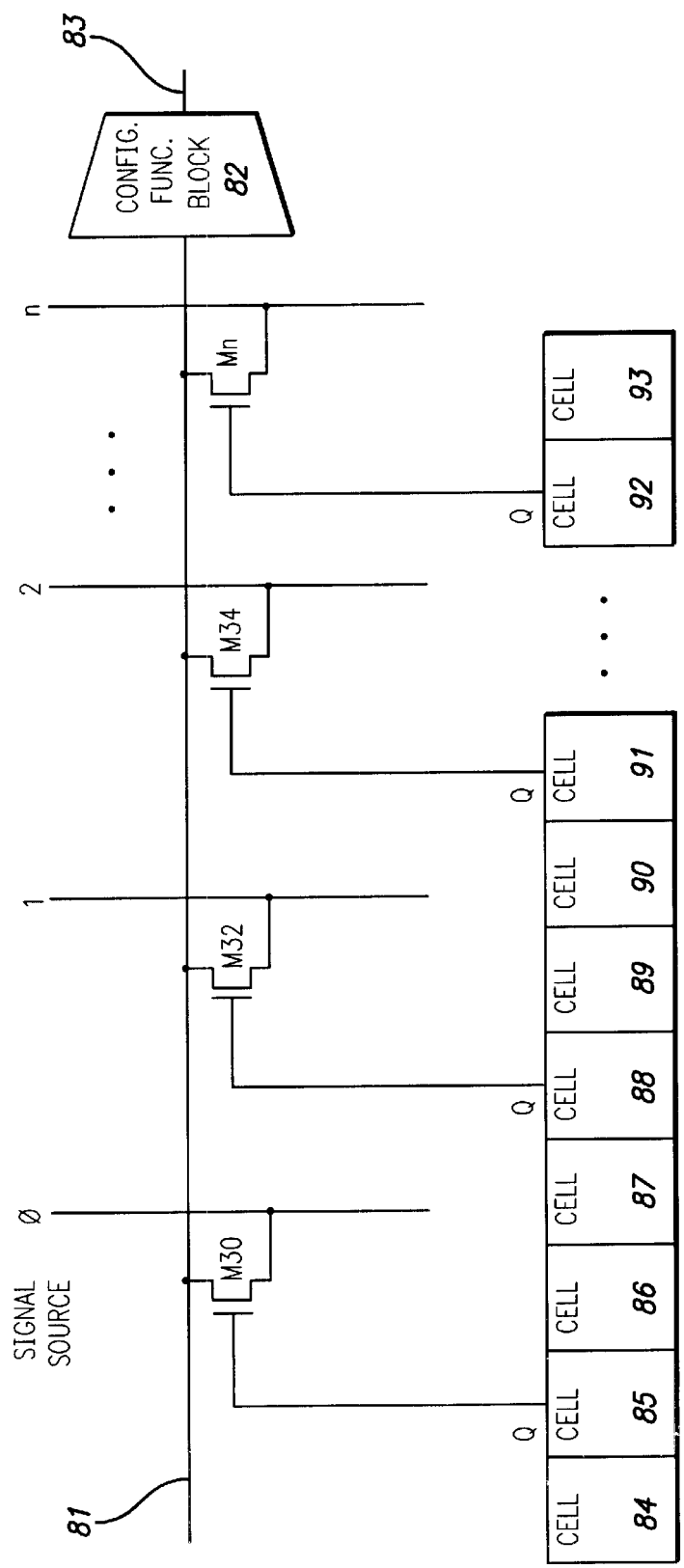
FIG. 3 is a schematic diagram illustrating a configurable functional block that may be included in the FPGA shown in FIG. 1.

Memory cells are also used in FPGAs to implement configurable functional blocks, logic functions, multifinction circuits, look-up tables (LUTs), and other circuits capable of realizing Boolean functions, etc. Configurable functional blocks typically include memory cells and connection transistors that may be used to configure logic functions such as addition, subtraction, etc., inside of an FPGA. A configurable functional block typically needs to select its inputs from a routing resource. For example, FIG. 3 illustrates a configurable functional block 82 that may be included in the FPGA 22 and which utilizes several memory cells. The configurable functional block 82 includes an input 81 and an output 83. A selected one of the signal sources 0, 1, 2, . . . n is connected to the input 81 by turning on the corresponding one of the connection transistors M30, M32, M34, . . . Mn. The connection transistors M30, M32, M34, . . . Mn are turned on and off by the Q output of the corresponding memory cells 85, 88, 91, 92. In other words, a single one of the n signal sources can be selected as the input 81 of the configurable functional block 82 by programming only one of the memory cells 85, 88, 91, 92 to have a "1" on its Q output.

As with the logic array 30, there are memory cells that are not being used with the configurable functional block 82. Specifically, the memory cells 84, 86, 87, 89, 90, and 93 are not coupled to any transistors, and so these memory cells are not being used with the configurable functional block 82. Therefore, the memory cells 84, 86, 87, 89, 90, and 93 may also be considered leftover cells that are not used.

These unused memory cells may be considered redundant memory cells. In order for there to be unused or leftover memory cells in an FPGA, the number of connection transistors will typically be fewer than the number of memory cells. Thus, the memory cells may be divided into two sets: a first set of memory cells that are used to implement programmable interconnections between the X and Y signal lines and to implement configurable functional blocks and the like, and a second set of memory cells that are not used to implement programmable interconnections between the X and Y signal lines and that are not used to implement configurable functional blocks and the like.

In accordance with the present invention, the unused memory cells in an FPGA, such as for example memory cells 62, 66 and 68 and/or memory cells 84, 86, 87, 89, 90, and 93, are used to store the license number (or other validating, identifying, or tracking number) or a portion of the license number. Because the unused memory cells are often scattered throughout the banks of memory cells and are not necessarily grouped together, the individual bits of the stored license number will also be scattered such that all bits of the license number may not be stored together in adjacent memory cells. If adjacent memory cells are available, however, the license number could be stored therein. The choice of which of the unused memory cells to use to store the license number is left to the FPGA designer.

Moreover, the entire license number, or even any portion of the license number, does not have to be stored. Specifically, the FPGA designer typically provides a license number to the IC manufacturer. The IC manufacturer is typically required to include the license number in the configuration data when configuring the FPGA. The entire license number that is provided to the IC manufacturer, however, does not have to be stored in the unused memories. The FPGA designer may design the system such that only a portion of the license number is actually stored. Or, the FPGA designer may design the system such that no portion of the license number is actually stored. The choice of whether to store the entire license number, only a portion of the license number, or not store any portion of the license number is left to the FPGA designer. Thus, memory cells that are not coupled to a connection transistor, even if there is only one such memory cell, may be used to store at least a portion of a license number in accordance with the present invention. Or, the FPGA designer may choose that no portion of the license number be stored in accordance with the present invention.

Figure 4:
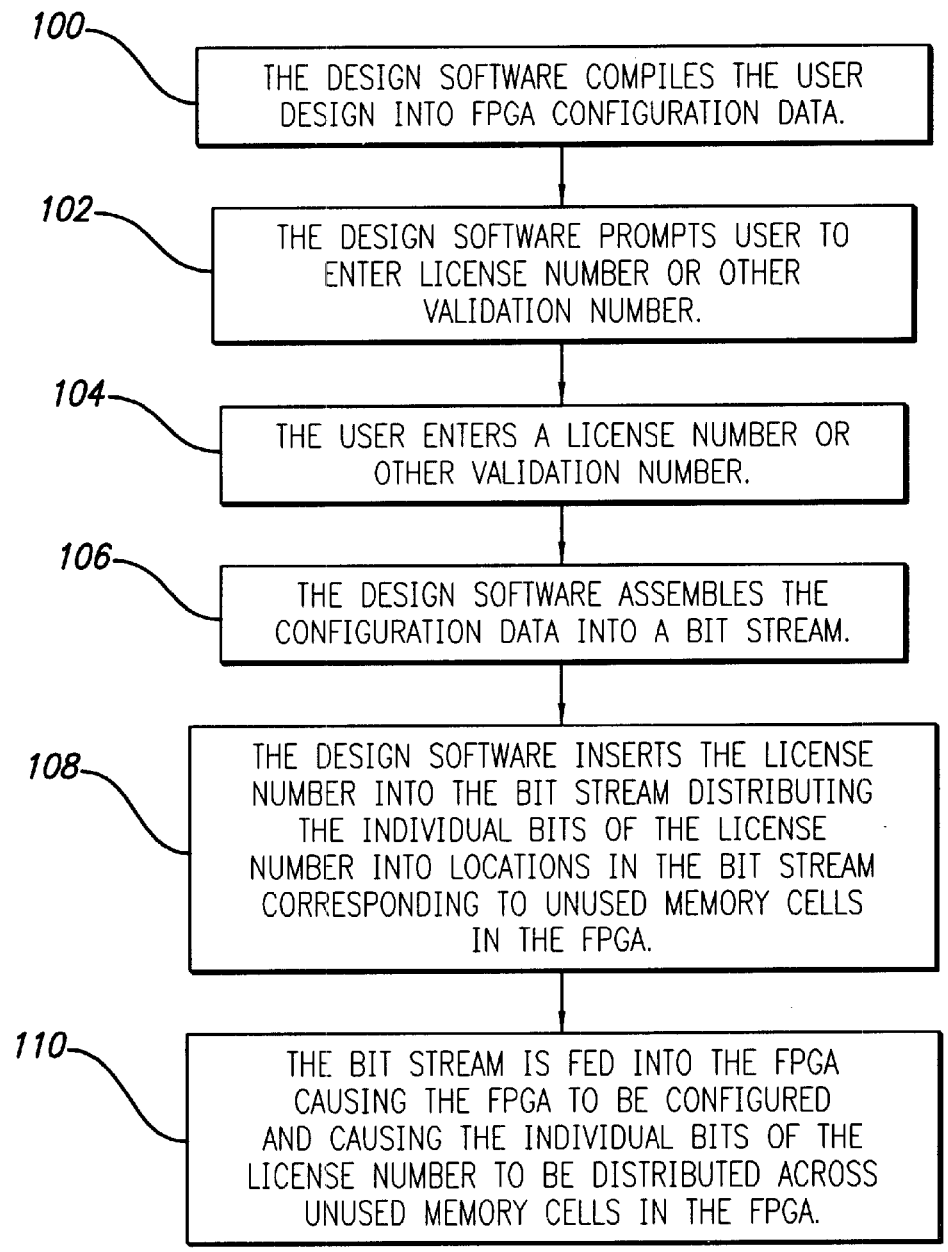
FIG. 4 is a flow diagram illustrating a process of configuring the FPGA shown in FIG. 1 in accordance with the present invention.

As mentioned above, the license number (or other validating, identifing, or tracking number) is included as part of the configuration data that is fed into the FPGA 22. The design software that is run by a field-programming unit (or the like) normally generates the configuration data and is used to insert the license number into the configuration data. FIG. 4 illustrates a general process flow that may be used by such design software.

The user of the design software, such as an IC manufacturer, begins by deciding upon a desired configuration of the programmable interconnections and the configurable functional blocks in the FPGA 22. The design software compiles the desired user design into FPGA "configuration data" in step 100. The configuration data will configure the FPGA 22 to the specific configuration desired by the user. This specific configuration may or may not be the final configuration. As discussed above, a memory cell implementation FPGA may be reprogrammed repeatedly.

In step 102, the design software prompts the user to enter a license number or other identifying, tracking or validation number. This is the number provided to the user by the FPGA 22 designer. The FPGA designer may require that the user key in the license number in order to continue configuring the FPGA 22. Either all or some of that license number will eventually be stored in the unused memories in the FPGA 22. In step 104 the user enters the license number into the design software.

In step 106 the design software assembles or generates the configuration data into a bit stream. The configuration data is used for configuring the programmable interconnections in the logic array 30 and the configurable functional blocks in the FPGA 22, and the way that the configuration data is transferred to the FPGA 22 is by feeding a bit stream into port 34. In step 108 the design software inserts the license number or a portion of the license number into the bit stream. The individual bits of the license number may be distributed into locations in the bit stream corresponding to unused memory cells in the FPGA 22. It is the choice of the FPGA designer as to which unused memory cells are used to store the license number and how much of the license number actually gets stored. The FPGA designer will typically have control over this because the FPGA designer will typically develop and provide the design software to the user.

In step 110 the bit stream (that includes the license number) is fed into the FPGA 22. This causes the FPGA 22 to be configured according to the configuration data and causes the individual bits of the license number to be distributed across, or stored in, unused memory cells in the FPGA 22. Again, the unused memory cells are, for example, memory cells that are not used for implementing the programmable interconnections among the X and Y signal lines in the logic array 30 and/or memory cells that are not used for implementing the configurable functional block 82.

Figure 5:
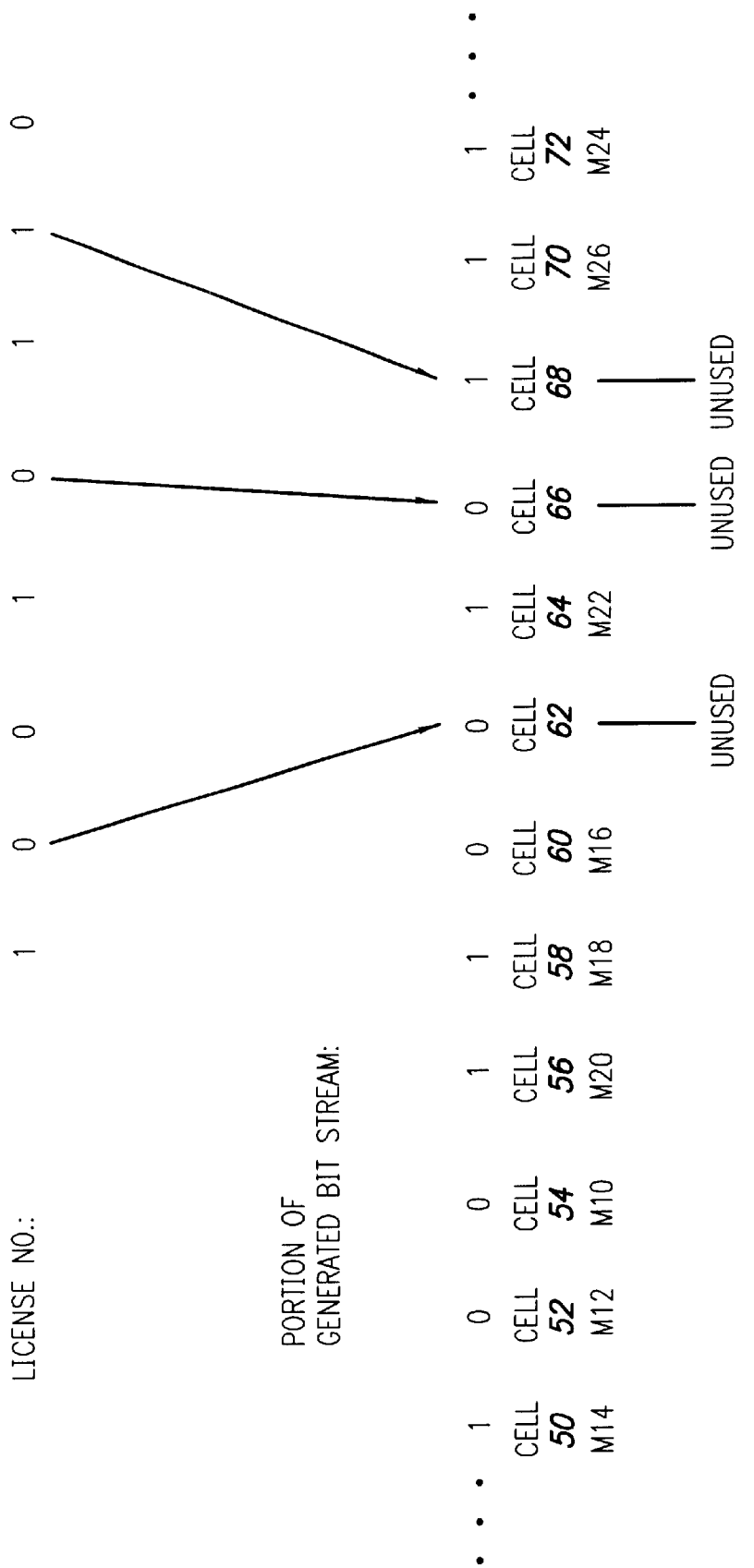
FIG. 5 is a diagram illustrating the step of inserting the license number into the bit stream shown in FIG. 4 in greater detail.

Referring to FIG. 5, there is illustrated an example of one way in which the design software may insert a portion of a license number into a generated bit stream as described in step 108. As shown, the license number includes eight bits, but only three bits are actually inserted into the bit stream for storage. The three selected bits are inserted into locations in the bit stream that correspond to the unused memory cells 62, 66, and 68. The memory cells 62, 66, and 68 are not coupled to connection transistors and are not used for implementing programmable interconnections in the logic array 30. Because the memory cells 62, 66, and 68 are not all adjacent, it may be said that the license number is scattered or distributed across the configuration data by the design software. This will cause the license number to be scattered around the unused memories. Additionally, the individual bits of the license number may be embedded into the bit stream in scrambled form, i.e., the bits of the license number are embedded into the bit-stream in a different order than they appear in the license number. It should be understood that all of the bits of the license number may be stored in the unused memories if enough unused memories exist. For example, the unused memory cells 84, 86, 87, 89, 90, and 93 could be used to stores additional bits of the license number.

After the license number is stored in the unused memories of the FPGA 22, the license number can be read back out in order to determine whether use of the FPGA 22 design is licensed. If a valid license number corresponding to the particular product is read out, this will tend to indicate that the use is valid. On the other hand, if a license number corresponding to a different product is read out of a suspect product, this will tend to indicate that the use of the FPGA 22 design is not valid and that the IC manufacturer (or other user) may be in violation of one or more license agreements. The license number can be read back from the FPGA 22 without disturbing its customized operation. In a typical scenario, if an FPGA designer becomes aware of new products developed by an IC manufacturer who has licensed the FPGA design only for a previous product, the FPGA designer may become suspicious that the IC manufacturer is using the FPGA design in the new products without authorization. The FPGA designer can obtain one of the new products and read the license number out. If the license number matches the license number that was provided to the IC manufacturer for the previously licensed product, the IC manufacturer has most likely violated the license agreement and attempted to use the FPGA design in a new product without obtaining a new license number.

In the scenario where no portion of the license number is actually stored in the FPGA 22, the license number can be read back out while the bit stream having the configuration data and license number is being fed into the FPGA 22. In this scenario it may be convenient to combine ports 34 and 36 into one port so that the license number (or a portion thereof) can be read out of the bit stream as it is being fed into the FPGA 22.

In the FPGA 22 discussed above, there is no license number check included in the FPGA 22 to check whether a valid license number has been entered. Instead, the user enters a license number and that license number is stored whether or not it is actually valid. Furthermore, the FPGA 22 will operate in accordance with its normal functionality whether or not the license number is actually valid. It is up to the FPGA designer to read back the license to determine whether a licensing violation has occurred and whether the FPGA designer will takes some sort of action to prevent the continued unauthorized use of the FPGA 22 design.

Figure 6:
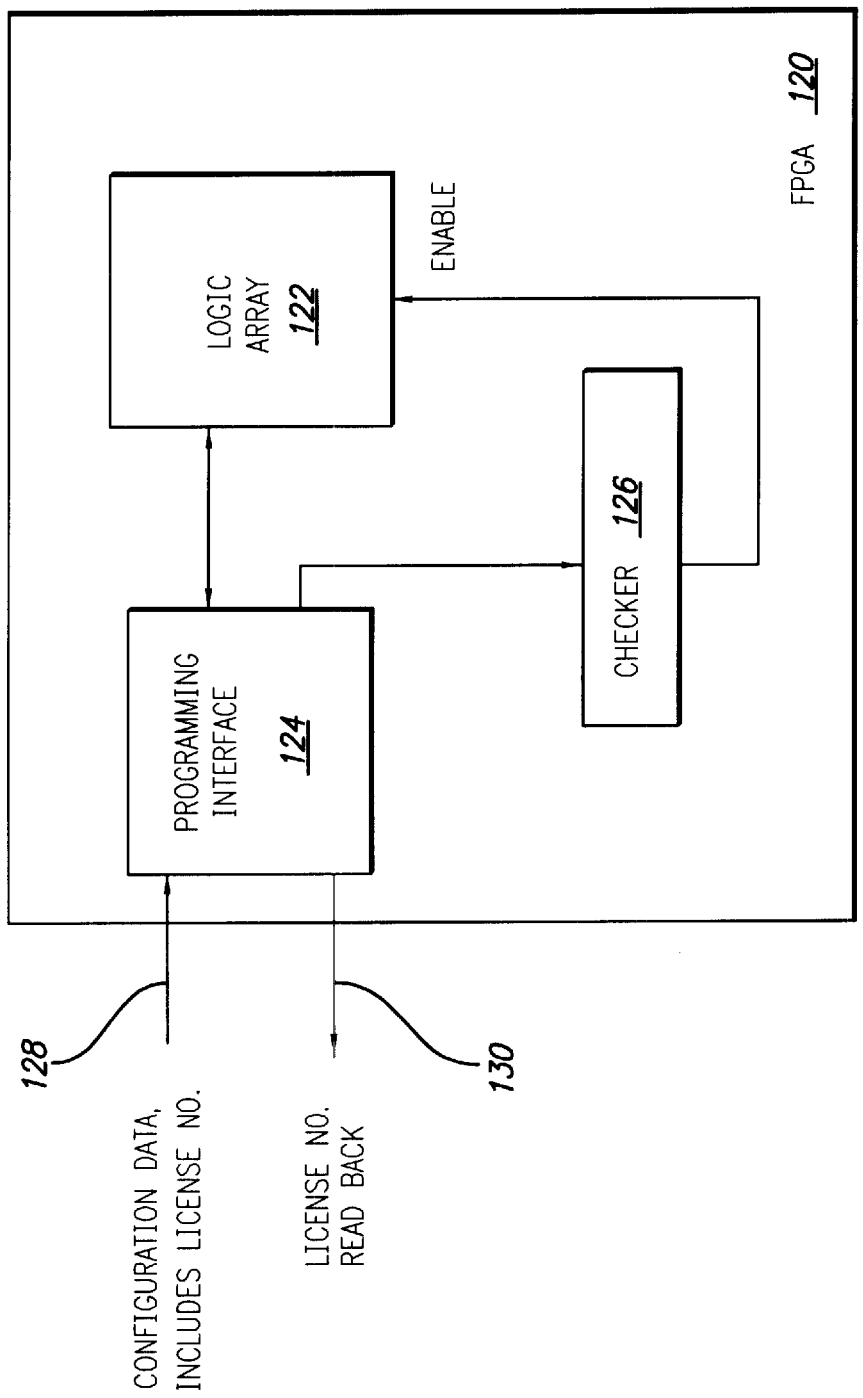
FIG. 6 is a block diagram illustrating an FPGA in accordance with the present invention.

Such a license number check, however, may be used in accordance with the present invention. Referring to FIG. 6, there is illustrated another FPGA 120 in accordance with the present invention. The FPGA 120 includes a logic array 122, a programming interface 124, and a license number checker or validator 126. During operation, a license number (or other validation number) or a portion of a license number is inserted into the configuration data bit stream as described above. The license number is stored in the unused memories in the FPGA 120 as described above. The license number checker or validator 126, which is built into the FPGA 120, checks the validity of the license number before the FPGA 120 can perform its customized functions. If the license number is valid, the checker 126 activates the Enable input of the logic array 122. If the license number is not valid, the checker 126 does not activate the Enable input, and the FPGA 120 cannot be used.

The license number checker or validator 126 can operate in at least a couple of different ways. First, the checker 126 may check the license number as it is transferred into the FPGA 120 while the configuration data is being stored in the memories. In this scenario the bits of the license number are transferred directly from the programming interface 124 to the checker 126 as the bit stream is fed into port 128. Second, the checker 126 may read the license number from the unused memories in the FPGA 120 after the license number has been stored. In this scenario the bit stream is completely fed into the FPGA 120, the license number is stored, and then the checker 126 checks the validity of the license number. It should be well understood that there are many other different ways in which the checker 126 can check the validity of the license number.

Figure 7:
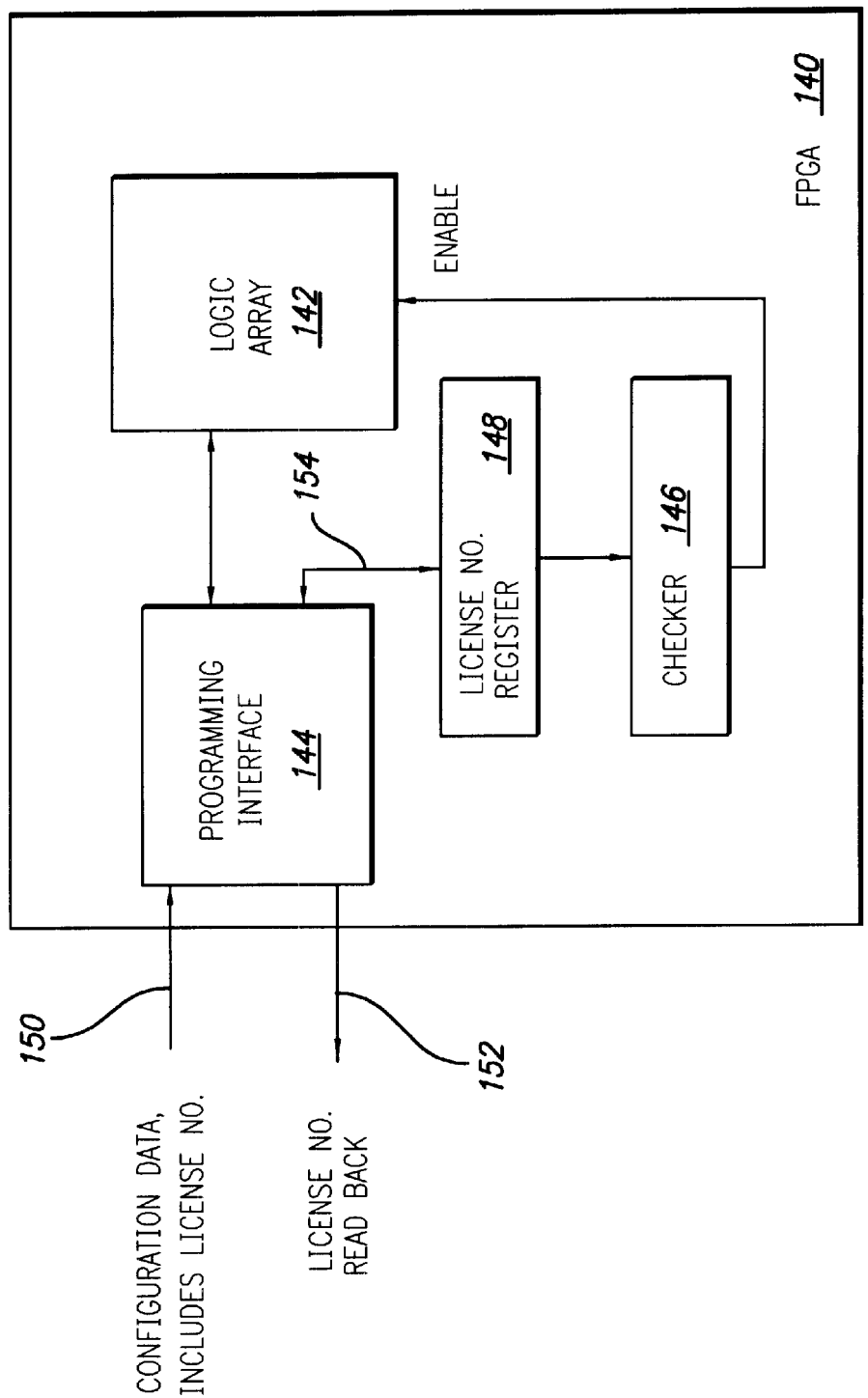
FIG. 7 is a block diagram illustrating an FPGA in accordance with the present invention.

Referring to FIG. 7, there is illustrated yet another FPGA 140 in accordance with the present invention. The FPGA 140 includes a logic array 142, a programming interface 144, a license number checker or validator 146, and a license number register 148. The FPGA 140 stores the license number that is included in the configuration data bit stream in the license number register 148. Specifically, the license number is included as part of the configuration data of the FPGA 140 as described above. When configuring the FPGA 140, the license number (or other validation number) is loaded into the license number register 148 (or other specific register). The license validator or checker 146 then checks the validity of the number in the license number register 148 before the FPGA 140 can perform its customized functions. If the license number is valid, the checker 146 activates the Enable input of the logic array 142. If the license number is not valid, the checker 146 does not activate the Enable input.

The license number register 148 is an added resource of the FPGA 140 to hold the license number provided in the configuration data. The checker 146 validates the content of the license register 148 and outputs an Enable signal that will enable or disable the operation of the FPGA logic array 142. It should be understood that the license number register 148 may comprise one or more of the unused memory cells as described above. For example, certain of the unused memory cells, such as for example memory cells 62, 66, and 68 and/or memory cells 84, 86, 87, 89, 90, and 93, may be designated as the license number register 148. Alternatively, the license number register 148 may comprise dedicated memory cells that are originally intended for use as the license number register 148. Or, the license number register 148 may comprise a combination of unused memory cells and dedicated memory cells. Furthermore, the memory cells that make-up the license number register 148 may all be grouped together or scattered around the FPGA 140.

Similar to as described above, after the license number is stored in the license number register 148, the license number can be read back out in order to determine whether use of the FPGA 140 design is licensed. The content of the license number register 148 can be read back without disturbing the operation of the FPGA 140. When reading back from the license number register 148, the license number is transferred from the register 148, over line 154, through the programming interface 144, and out of port 152. It should be well understood that there are many other different ways in which the license number can be read back from the license number register 148.

In summary, the present invention provides a licensing mechanism to track and validate the use of embedded FPGAs in various integrated circuits. The configuration data includes a license number (or other identifying number) given to the customer to input into the FPGA design software to generate the configuration data. The license number may be any type of number that the FPGA designer wishes to use to track and validate the use of the FPGA design. As used herein, the term "validation number" is meant to include all such types of numbers, including but not limited to, license numbers, tracking numbers, identifying numbers, etc. The license number may be scattered throughout the configuration data and stored in unused memories and/or a dedicated license number register. The license number may or may not be used to enable operation of the logic array 142.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A method of configuring a field-programmable gate array (FPGA), comprising:
    storing configuration data used for configuring programmable interconnections among a plurality of X and Y signal lines in memory cells in the FPGA used for implementing the programmable interconnections; and
    storing at least one bit of a validation number, the validation number comprising a plurality of bits of data, in memory cells not utilized for implementing the programmable interconnections in the FPGA.

2. A method in accordance with claim 1, further comprising:
    generating a first bit stream based on the configuration data used for configuring programmable interconnections in the FPGA; and
    inserting at least one bit of the plurality of bits of the validation number, into the first bit stream to form a second bit stream, the at least one bit of the plurality of bits of the validation number of data being inserted into at least one location in the first bit stream corresponding to the memory cells in the FPGA that are not used for implementing the programmable interconnections.

3. A method in accordance with claim 2, further comprising:
    feeding the second bit stream into the FPGA to configure the programmable interconnections in the FPGA and to store at least one bit of the plurality of bits of the validation number in the memory cells in the FPGA that are not used for implementing the programmable interconnections.

4. A method in accordance with claim 1, further comprising:
    reading at least one bit of the plurality of bits of the validation number out of the FPGA.

5. A method in accordance with claim 1, further comprising:
    checking whether at least one bit of the plurality of bits of the validation number corresponds to a preselected valid number.

6. A method in accordance with claim 1, wherein at least one bit of the plurality of bits of the validation number is stored in a register in the FPGA that comprises at least some of the memory cells in the FPGA that are not used for implementing the programmable interconnections.

7. A method in accordance with claim 1, wherein the step of storing configuration data used for configuring programmable interconnections among a plurality of X and Y signal lines comprises:
    storing configuration data in memory cells used for configuring a configurable functional block included in the FPGA.

8. An apparatus including a field-programmable gate array (FPGA), the FPGA comprising:
    a plurality of X signal lines;
    a plurality of Y signal lines; and
    a plurality of memory cells, wherein a first set of memory cells are includes at least one of the plurality of memory cells, and the first set of memory cells are used to implement programmable interconnections between the X and Y signal lines, and wherein a second set of the memory cells includes at least one of the plurality of memory cells, and the second set of memory cells are not used to implement programmable interconnections between the X and Y signal lines;
    wherein configuration data used to implement a specific configuration of the programmable interconnections between the X and Y signal lines is stored in the first set of memory cells and at least one bit of a validation number, the validation number comprising a plurality of bits of data, stored in at least one of the plurality of memory cells of the second set of memory cells.

9. An apparatus in accordance with claim 8, wherein each memory cell corresponds to an intersection of one of the X signal lines with one of the Y signal lines, and wherein the FPGA further comprises:
    a plurality of connection transistors that is fewer in number than the plurality of memory cells, each connection transistor being coupled to a different one of the first set of the memory cells and coupled to the one of the X signal lines and the one of the Y signal lines of the intersection corresponding to the memory cell.

10. An apparatus in accordance with claim 9, wherein at least one of the memory cells of the second set of the memory cells is not coupled to a connection transistor and is used to store at least one bit of the plurality of bits of the validation number.

11. An apparatus in accordance with claim 8, wherein the FPGA further comprises:
    an input port for feeding a bit stream into the FPGA to configure the programmable interconnections in the FPGA and to store at least one bit of the plurality of bits of the validation number in the second set of memory cells in the FPGA.

12. An apparatus in accordance with claim 8, wherein the FPGA further comprises:
    an output port for reading at least one bit of the plurality of bits of the validation number out of the FPGA.

13. An apparatus in accordance with claim 8, wherein the FPGA further comprises:
    a checker configured to check whether the at least one bit of the plurality of bits of the validation number corresponds to a preselected valid number.

14. An apparatus in accordance with claim 8, wherein the FPGA further comprises:

a register for storing the at least one bit of the plurality of bits of the validation number, the register comprising at least some of the second set of the memory cells in the FPGA that are not used for implementing the programmable interconnections.

15. An apparatus in accordance with claim 8, wherein the FPGA further comprises:

a configurable functional block, wherein some of the first set of the memory cells are used with the configurable functional block and the second set of the memory cells are not used with the configurable functional block.

16. An apparatus in accordance with claim 8, wherein the apparatus comprises a system on a chip (SOC) with the FPGA embedded therein.

* * * * *